W. ANDERSON.
SHOCK ABSORBER FOR VEHICLES.
APPLICATION FILED FEB. 11, 1916.
1,211,272.
Patented Jan. 2, 1917.
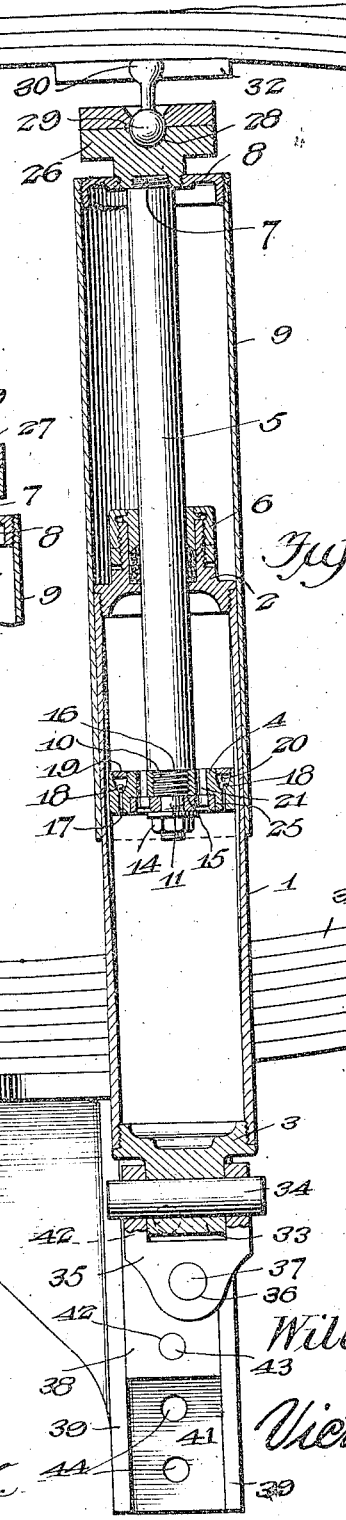
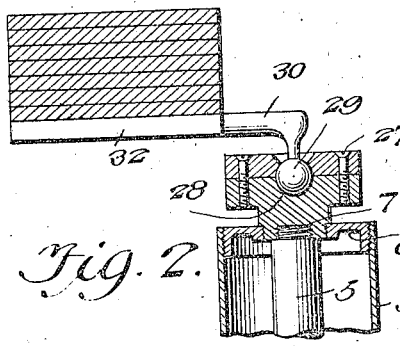
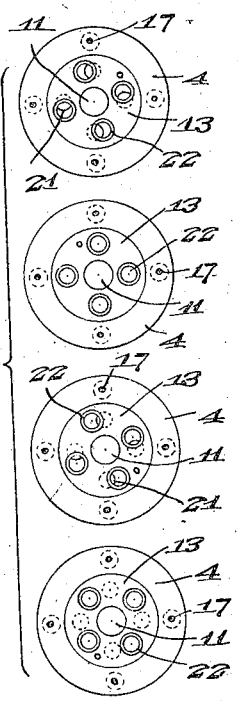
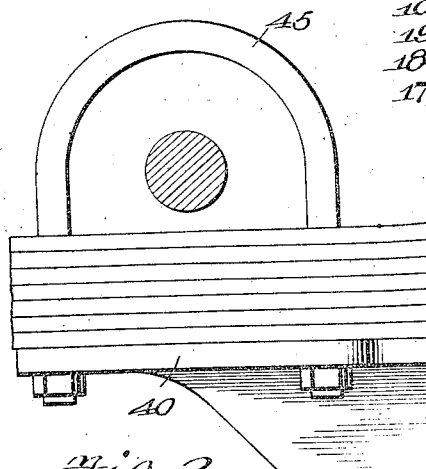
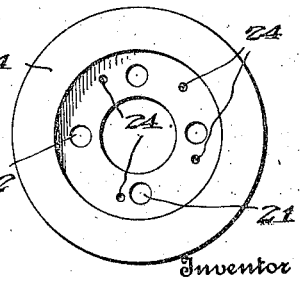
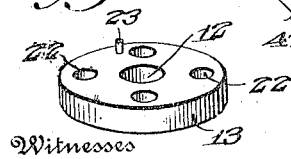
Inventor
William Anderson
Victor J. Evans
Attorney
Witnesses
Hugh H. Ott
R. M. Smith

UNITED STATES PATENT OFFICE.

WILLIAM ANDERSON, OF HARRISBURG, PENNSYLVANIA.

SHOCK-ABSORBER FOR VEHICLES.

1,211,272.  Specification of Letters Patent.  Patented Jan. 2, 1917.

Application filed February 11, 1916. Serial No. 77,761.

*To all whom it may concern:*

Be it known that I, WILLIAM ANDERSON, a citizen of the United States, residing at Harrisburg, in the county of Dauphin and State of Pennsylvania, have invented new and useful Improvements in Shock-Absorbers for Vehicles, of which the following is a specification.

This invention relates to shock absorbers for vehicles, the main object of the invention being to provide in connection with a fluid shock absorber embodying a cylinder and a reciprocatory piston, novel means for adjusting the shock absorber as a whole to vehicles of different weights and variable loads.

More specifically, the object in view is to provide in connection with the piston of a shock absorber of the type referred to, an adjustable throttle, damper or governor, the same being carried by the piston and serving to regulate the rapidity with which the fluid will pass through the piston, thereby retarding or accelerating the movement of the piston accordingly.

With the above and other objects in view, the invention consists in the novel construction, combination and arrangement of parts, as herein described, illustrated and claimed.

In the accompanying drawings:—Figure 1 is a diametrical section through a shock absorber embodying the present invention. Fig. 2 is a fragmentary section showing the top attaching means. Fig. 3 is a perspective view of the throttle. Fig. 4 is a bottom plan view of the piston. Fig. 5 represents a series of diagrams illustrating the several positions of the throttle in relation to the piston.

The shock absorber is shown as comprising a cylinder 1 closed at its opposite ends by heads 2 and 3. Working in the cylinder 1 is a reciprocatory piston 4 which is fastened to one end of a piston rod 5, the latter working through a stuffing box 6 on the head 2 of the cylinder. The rod 5 is threaded at 7, and a cap 8 is externally threaded and screwed into the upper end of a protecting sleeve 9 which closely embraces and slides upon the cylinder 1 so as to exclude dirt, dust and other foreign matter and retain oil for lubricating purposes.

The piston 4 is centrally bored and threaded to receive the reduced threaded end portion 10 of the piston rod 5 and adjacent to its extremity said rod is further reduced at 11 to pass through central opening 12 of an adjustable throttle 13, the latter being secured to the rod 5 by means of a nut 14 on the threaded extremity of the rod 5 as clearly shown in Fig. 1. The nut 14 serves to hold the throttle 13 against the shoulder 15 of the rod 5 and also serves to hold the piston against the shoulder 16 of the piston rod.

The piston 4 is provided adjacent to the outer margin thereof with ports 17 in which are arranged check valves 18 retained in place by threaded plugs 19 screwed into the enlarged end portions of the ports 17. Lateral passages 20 extend from the ports 17 to the upper surface of the piston 4.

The piston is additionally provided with a circular series of ports 21 and the throttle 13 is provided with a corresponding series of ports 22 movable into and out of registry with the ports 21 of the piston as indicated in Fig. 5, the ports 21 and 22 being shown in full registration in Fig. 1. In order to provide for retaining the throttle 13 in its adjusted position, said throttle is provided with an upstanding pin 23 while the adjacent face of the piston is formed with a circular series of pin sockets 24 any one of which is adapted to receive the pin 23. The piston is formed with a circular recess 25 in which the throttle 13 is seated so as not to project beyond the adjacent face of the piston.

From the foregoing description, taken in connection with the accompanying drawings, it will now be understood that by removing the nut 14, the throttle 13 may be withdrawn sufficiently to disengage the pin 23 from the socket 24 with which it has been in engagement. The throttle 13 may now be turned on the end portion 11 of the piston rod 5 and the pin 23 may be inserted in any other desired socket 24. In this way the ports 21 and 22 may be brought into any one of the several positions shown in Fig. 5, either to provide a full opening for each port or a partially closed opening or to provide for a full closure of all of said ports. This enables the size of the ports 21 through the piston to be varied for the purpose of accelerating or retarding the movement of the fluid through the piston, it being understood that the cylinder 1 is practically filled with any suitable fluid which will serve the purpose. Thus the shock absorber as a whole is readily adaptable to vehicles of different sizes, weights and load-carrying capacity by a simple adjustment of the throttle 15 which is locked in any position to which it may be adjusted.

The attaching means for the upper end of the shock absorber comprises a head 26 consisting of two separable members as shown in Figs. 1 and 2, connected together by fasteners 27 and chambered to form a ball socket 28 which receives a ball 29 on an arm or shank 30 extending laterally with respect to the vehicle spring 31 from an attaching plate 30 which is fastened to the spring 31 either on the under side or upper side of the top section of the spring by any convenient means. A ball and socket joint is thus formed at the upper end of the shock absorber which allows for both fore and aft and lateral movement of the upper portion of the spring 31 without injuring or impairing the efficiency of the device.

At the lower end of the cylinder 1 the head 3 is provided with a lug 33 connected by a pivot pin 34 to a coupling 35. This coupling is formed with a hole 36 to receive a pivot stud 37 on a stud plate 38 which is adjustable vertically between the parallel flanges 39 of a bottom attaching member shown as comprising a plate 40 and a depending arm 41, the latter being provided with the flanges 39 referred to. 42 designates a bracing or reinforcing web between the plate 40 and the arm 41. The stud plate 38 is formed with holes 42 to receive fastening devices such as pins 43 which are also receivable in holes 44 in the arm 41. The construction just described enables the stud plate 38 to be adjusted vertically so as to accommodate the shock absorber as a whole to vehicle springs of different sizes. Thus the body of the shock absorber is connected by a universal joint to the vehicle at the bottom end thereof and by a ball and socket joint to the vehicle spring at the top thereof. This allows the shock absorber to sway in any direction without impairing the efficiency thereof.

The plate 40 is shown as fastened to the under side of the bottom portion of the spring 31 by means of a U-shaped bolt or clip 45 which embraces the rear axle housing. Any means may be provided, however, for securing the plates 32 and 40 to the upper and lower portions of the vehicle spring 31. The cap 26 is shown as threaded upon the upper extremity of the piston rod 5 and also externally threaded to receive the cap 8 which carries the protecting sleeve 9.

Having thus described my invention, I claim:—

1. In a shock absorber of the fluid cylinder and piston type, the combination with a piston rod, of a piston formed with a circular series of ports extending therethrough, an adjustable throttle of circular formation carried by said piston and provided with a circular series of ports corresponding in number to those in the piston, said throttle being adapted to be turned for moving the ports thereof partly or wholly into and out of line with the ports in the piston, the said piston and throttle members being provided one with an eccentric locking pin and the other with a circular series of sockets any one of which is adapted to receive said pin to form an interlocking connection between the piston and throttle valve, and a nut on said piston which clamps the throttle valve against the piston.

2. In a shock absorber of the fluid cylinder and piston type, an attaching connection at one end thereof comprising an attaching plate, a substantially vertical arm on said plate, a stud plate adjustable longitudinally of said arm, a pivot stud projecting from said stud plate, a coupling member pivotally mounted on said stud, and a pivot pin connecting said coupling member to one end of the cylinder, said coupling pin extending at a right angle to said pivot stud.

In testimony whereof I affix my signature in presence of two witnesses.

WILLIAM ANDERSON.